United States Patent [19]

Myers, Sr. et al.

[11] 4,195,483
[45] Apr. 1, 1980

[54] ENGINE APPARATUS

[76] Inventors: Wallace C. Myers, Sr., 5107 Cochita Dr.; Wallace C. Myers, Jr., 2625 Healy Dr.; James A. Pollet, 4202 Brittany Rd., all of Orlando, Fla. 32808; Thomas E. Myers, 1815 Preston Rd., Brooksville, Fla. 33512

[21] Appl. No.: 907,984

[22] Filed: May 22, 1978

[51] Int. Cl.$^2$ .......................... F03G 3/00; F03G 7/06
[52] U.S. Cl. .......................................... 60/530; 60/675
[58] Field of Search ................ 60/530, 531, 641, 650, 60/682, 670, 671, 675

[56] References Cited

U.S. PATENT DOCUMENTS

| | | | |
|---|---|---|---|
| 2,513,692 | 7/1950 | Tubbs | 60/531 |
| 4,074,534 | 2/1978 | Morgan | 60/531 X |
| 4,121,420 | 10/1978 | Schur | 60/531 |

*Primary Examiner*—Allen M. Ostrager
*Attorney, Agent, or Firm*—Duckworth, Hobby, Allen & Pettis

[57] ABSTRACT

An engine apparatus is adapted to operate upon partial immersion in a heated liquid in a liquid reservoir. A movably mounted frame is mounted to a fixed frame and located adjacent the liquid reservoir in a manner that heat exchangers attached to the movable frame are successively passed into the liquid of the liquid reservoir. The heat exchangers are connected in pairs on opposite sides of the movable frame and contain a low boiling point liquid therein. Each heat exchanger of each pair is connected to the other through a pair of drive cylinders, so that the expansion of the fluid in the heat exchanger passing through the liquid reservoir and the simultaneous contraction of fluid in the heat exchanger that has left the reservoir expands and contracts the drive cylinders to operate the engine. The engine will operate from a low temperature heated liquid such as may be provided by solar panels or water heat from power plants.

9 Claims, 5 Drawing Figures

4,195,483

ENGINE APPARATUS

BACKGROUND OF THE INVENTION

The present invention relates to slow rotating engines which operate using a low temperature heated liquid to boil a low boiling liquid for utilizing low temperature heat sources.

In the past, engines have been available that use a low boiling liquid which is forced from a lower-most compartment directly into an upper-most compartment. But the transfer is incomplete, so some of the liquid remains in the lower-most compartment where it acts as a counter-weight, reducing the efficiency of the engine. In addition, the engine is forced to operate at a slow speed to permit adequate opportunity for the liquid in the lower-most compartment to be heated to generate enough pressure to effect the desired transfer to the higher compartment, and in addition, the transfer of liquid raises the pressure in the upper-most compartment, thereby hampering the desired lifting action. It has been proposed in one prior U.S. Pat. No. 4,012,911, to provide an engine powered by a low boiling liquid which operates upon partial immersion in a heated liquid by using a circular train of tubular compartments, in which adjacent compartments are interconnected but including check valves to allow liquid to flow in one direction, but not in the other within each compartment. In another U.S. Pat. No. 3,984,985, a solar engine is provided in which compartments are expanded with solar heat to effect a rotary motion. The present engine overcomes disadvantages of the prior engines using a low boiling point liquid, in that rather than raising the liquid for use in a gravity pull, the present engine uses the expansion of the low boiling point liquid to drive or contract cylinders, which then generate the torque for rotating the wheel. The weight of the condensed liquid may also be used to gain some additional advantage.

SUMMARY OF THE INVENTION

An engine adapted to operate upon partial immersion in a heated liquid is mounted adjacent a liquid reservoir which may contain a low temperature liquid. The engine has a fixed frame and a movably mounted circular frame, movably mounted to the fixed frame and located adjacent the liquid reservoir. A plurality of heat exchangers are mounted on the movable frame which are positioned to be rotated sequentially into the liquid reservoir, where a low boiling point liquid within the heat exchanger expands, while the heat exchanger outside of the liquid is cooling, thereby condensing the liquid therein. Each heat exchanger is connected to two separate drive cylinders, one connection at either end of the cylinder whereas an opposite heat exchanger is connected to the opposite ends of the same cylinders as the one. Extending and retracting the power rods of the cylinders may then drive a linkage to rotate the movable frame to generate kinetic energy from the low temperature heated liquid reservoir.

BRIEF DESCRIPTION OF THE DRAWINGS

Other objects, features, and advantages of the present invention will be apparent from the written description and the drawings, in which.

DESCRIPTION OF THE PREFERRED EMBODIMENT

Figure 1:
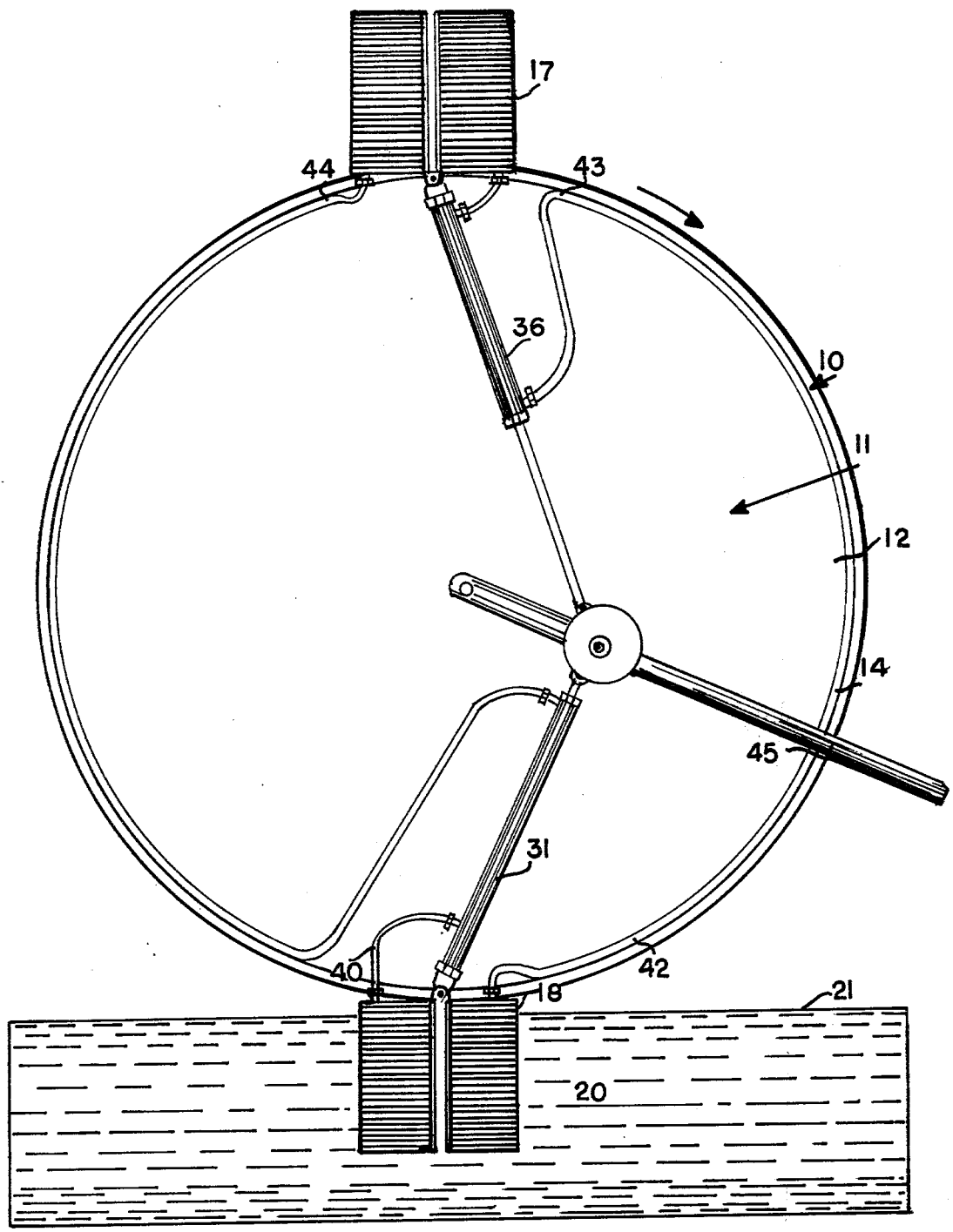
FIG. 1 is a side sectional view of an engine in accordance with the present invention showing a pair of heat exchangers thereon.
Figure 2:
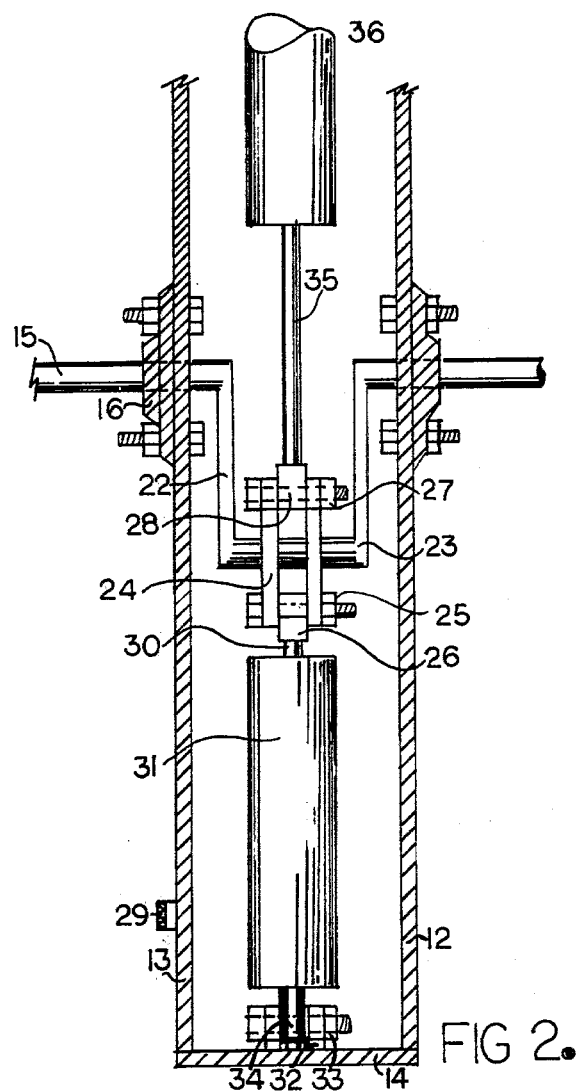
FIG. 2 is a sectional view taken on the line 2—2 of FIG. 1.

Referring now to the drawings, an engine 10 has a rotating wheel 11 having circular side plates 12 and 13 and an outer rim 14. Side plate 13 has been removed in FIG. 1 to show the operation of the engine. The wheel 11 is mounted to a fixed shaft 15 and has main bearings 16 attached thereto for riding on the shaft 15 as the wheel 11 rotates. The rim 14 has a first heat exchanger 17 mounted thereon and a second heat exchanger 18 mounted directly opposite from the heat exchanger 17 on the rim 14. It will, of course, be clear that in the actual engine, eight or more heat exchangers would be typically used, each connected in pairs. The heat exchangers 17 and 18 rotate on the wheel 11 and sequentially rotate into a liquid 20 in a reservoir 21. Typically, the liquid 20 would be a low temperature liquid which may be heated by solar heat, or may be supplied by disposal water from power plants, or the like. The main shaft 15 has a pair of support arms 22 attached thereto supporting a stationary offset crankshaft 23, which crankshaft has a pair of rotary links 24 rotatably mounted thereon and connected by bolts 25 to a cylinder rod connecting member 26 and by bolts 27 to a cylinder rod connecting member 28. Cylinder rod connecting member 26 is connected to a cylinder rod 30 which is connected to a drive cylinder 31 shown in a retracted position in FIG. 2, which is in turn connected by a bracket 32 having a bolt shaft 33 therein supporting a cylinder connecting member 34. Similarly, cylinder rod connecting member 28 is connected to a cylinder rod 35 connected to a cylinder input 36. The wheel 11 is rotated by the alternate extending and retracting of the cylinder rods 30 and 35 by the cylinders 31 and 36, which drives the rotary linkage 24 applying pressure to the stationary shaft 23, which is offset from the main shaft 15, and thereby forces the turning of the wheel 11. Thus, when cylinder 31 is retracted, cylinder 36 is extended and as cylinder 31 extends, cylinder 36 retracts. The extension and retraction is accomplished by the connections to the heat exchangers 17 and 18 which may be standard finned tubing positioned in coils, or the like, with the heat exchanger 18 having a tube 40 connected thereto and connected to the heat exchanger 18 and to the opposite end of cylinder 36. Similarly, heat exchanger 17 has a short tube 43 which is connected to the close end of cylinder 36 and a long tube 44 which is connected to the opposite end of cylinder 31 from the tube 40. Heat exchangers 17 and 18, along with the tubes 40, 42, 43 and 44, and the cylinders 31 and 36 have a low boiling liquid therein, which is boiled by the low temperature liquid 20 as the heat exchanger passes through the reservoir 21. This expands the liquid, generating a gas which drives the cylinder 31 as illustrated in FIG. 1, expanding the cylinder rod 30 and simultaneously driving the cylinder 36 into the cylinder. When the heat exchanger 17 reaches the reservoir, the process works in a reverse manner, so that each pair of heat exchangers 17 and 18, and each pair of cylinders 31 and 36, are simultaneously extended and retracted to drive the wheel 11 continuously as each heat exchanger passes through the reservoir. The heat exchanger 17 is cooled as it passes from the liquid 21 so that it generates a suction or reduced pressure to assist in retracting the cylinder 36 at the same time as heat exchanger 18 is driving the cylinder 36 through tube 42. A stabilizer bar 45 assists in the stabilization of the wheel as it rotates.

Figure 3:
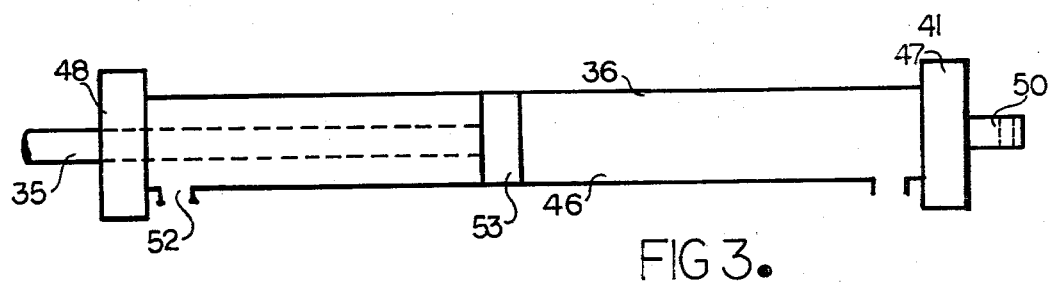
FIG. 3 is a sectional view taken on the line 3—3 of FIG. 1.

The operation of the cylinder 31 or 36 can be seen in FIG. 3, in which the cylinder 36 has a cylindrical portion 46 with ends 47 and 48 and a cylinder rod 35 and a connecting bracket 50, along with gas or liquid ports 51 and 52 at each end inside the piston and a piston 53 connected to the rod 35. As the piston is pushed in either direction, it pushes the rod 35 back and forth during the operation of the engine.

Figure 5:
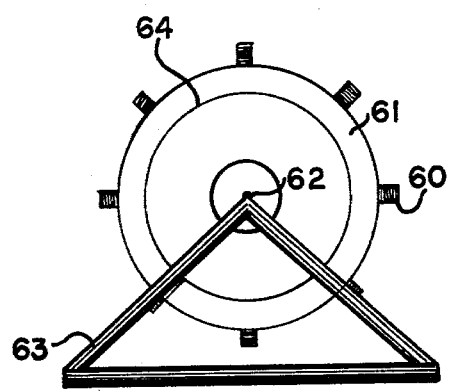
FIG. 5 is a side elevation of the overall engine without the reservoir.

FIG. 1 only shows two heat exchangers 17 and 18, but it will be clear from FIG. 5 that four pairs, or eight heat exchangers can each be connected to a separate offset crankshaft connected to the main shaft 15 with each pair having a rotary linkage mounted thereto along with a pair of cylinders, with each cylinders interconnected as illustrated in FIG. 1 by tubing 40, 42, 43 and 44. A principal advantage of the present engine is the use of low temperature liquid to generate kinetic energy, which while moving at a slow speed generates substantial torque, which can be connected through a gear box to drive an electrical generator or the like. The gear box connection can be made to a circular rack 29 mounted to the side of the wheel 11 for driving a gear connected thereto. It will also be clear that a low boiling liquid is used, such as certain types of freon, which are liquid until heated to a predetermined low temperature, at which time they are converted to a gas which generates the necessary pressure for operating the present engine, which can capture lost low temperature from power plants or other industrial water cooling systems. The rotating wheel and most components can be made of steel, even though the heat exchangers and tubing would typically be made of alloys of copper or aluminum. The present invention, however, is not to be construed as limited to the particular forms herein, which are to be considered illustrative rather than restrictive.

Figure 4:
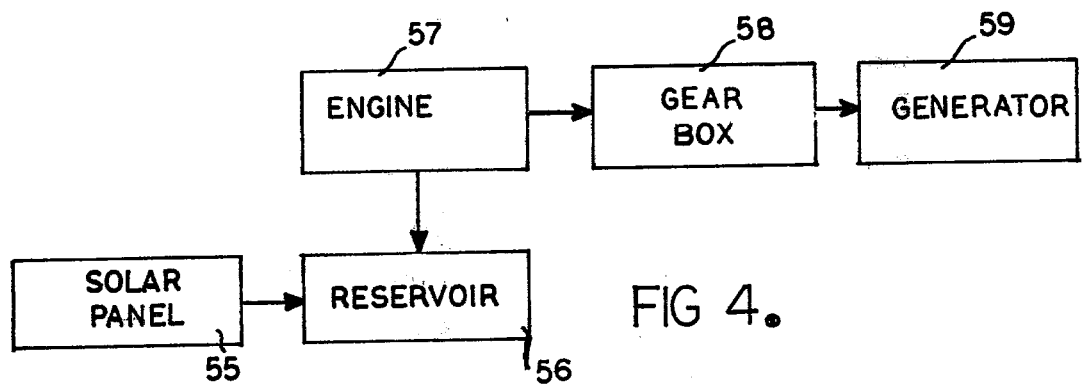
FIG. 4 is a block diagram of a system using the engine of FIGS. 1 through 3.

The block diagram of FIG. 4 has a solar panel 55 for collecting solar heat for heating the liquid in the reservoir 56 which drives the engine 57. The output from engine 57 is low speed, high torque so that a gear box 58 increases the RPM to the generator 59 which generates electricity.

FIG. 5 shows eight heat exchangers 60 connected to the wheel 61 which rotates on the central shaft riding on support framework 63 and having a gear power takeoff 64. FIGS. 4 and 5 illustrate the overall concept of using the engine of FIGS. 1 through 3.

We claim:
1. An engine adapted to operate upon partial immersion in a heated liquid comprising in combination:
   a liquid reservoir;
   a fixed frame;
   a movably mounted frame movably mounted to said fixed frame and located adjacent said liquid reservoir;
   heat exchanger means having a plurality of fluid containing heat exchanger units mounted on said movably mounted frame;
   drive cylinder means having a plurality of drive cylinders operatively connected to at least two heat exchanger units for driving said movably mounted frame responsive to expansion of fluid in one said heat exchanger unit as it passes into said liquid reservoir; and
   one said heat exchanger unit being connected by a fluid line to one said cylinder at one end thereof and to a second said cylinder through a fluid line at the opposite end of said second cylinder and a second heat exchanger being connected by a fluid line to one end of the second cylinder and through a fluid line to the other end of the first cylinder, whereby said engine is driven by heat from said liquid reservoir and said heat exchangers can drive both cylinders simultaneously.

2. The engine in accordance with claim 1, in which a plurality of cylinders are connected to an offset fixed shaft located on said movable frame.

3. The apparatus in accordance with claim 1, in which said movable frame is a generally circular frame.

4. The engine in accordance with claim 3, in which each said heat exchanger has finned tubing wrapped to form a heat exchanger.

5. The engine in accordance with claim 4, in which each said heat exchanger of each pair of heat exchangers is mounted on the opposite side of said circular frame from the other heat exchanger of said pair.

6. The engine in accordance with claim 5, in which at least one stabilizer bar is mounted to said movable frame.

7. The engine in accordance with claim 6, in which said movable frame rotates on a fixed center shaft.

8. The engine in accordance with claim 7, in which said offset fixed shaft is connected by arms to said fixed center shaft and said cylinders are connected to said offset shaft with a rotary link rotatably mounted to said offset shaft.

9. The engine in accordance with claim 8, in which each said cylinder has a piston therein and a port in each end thereof with said piston rod connected to said cylinder whereby said piston can be driven from either end by a fluid passing thereinto.

* * * * *